United States Patent Office 3,089,597
Patented May 14, 1963

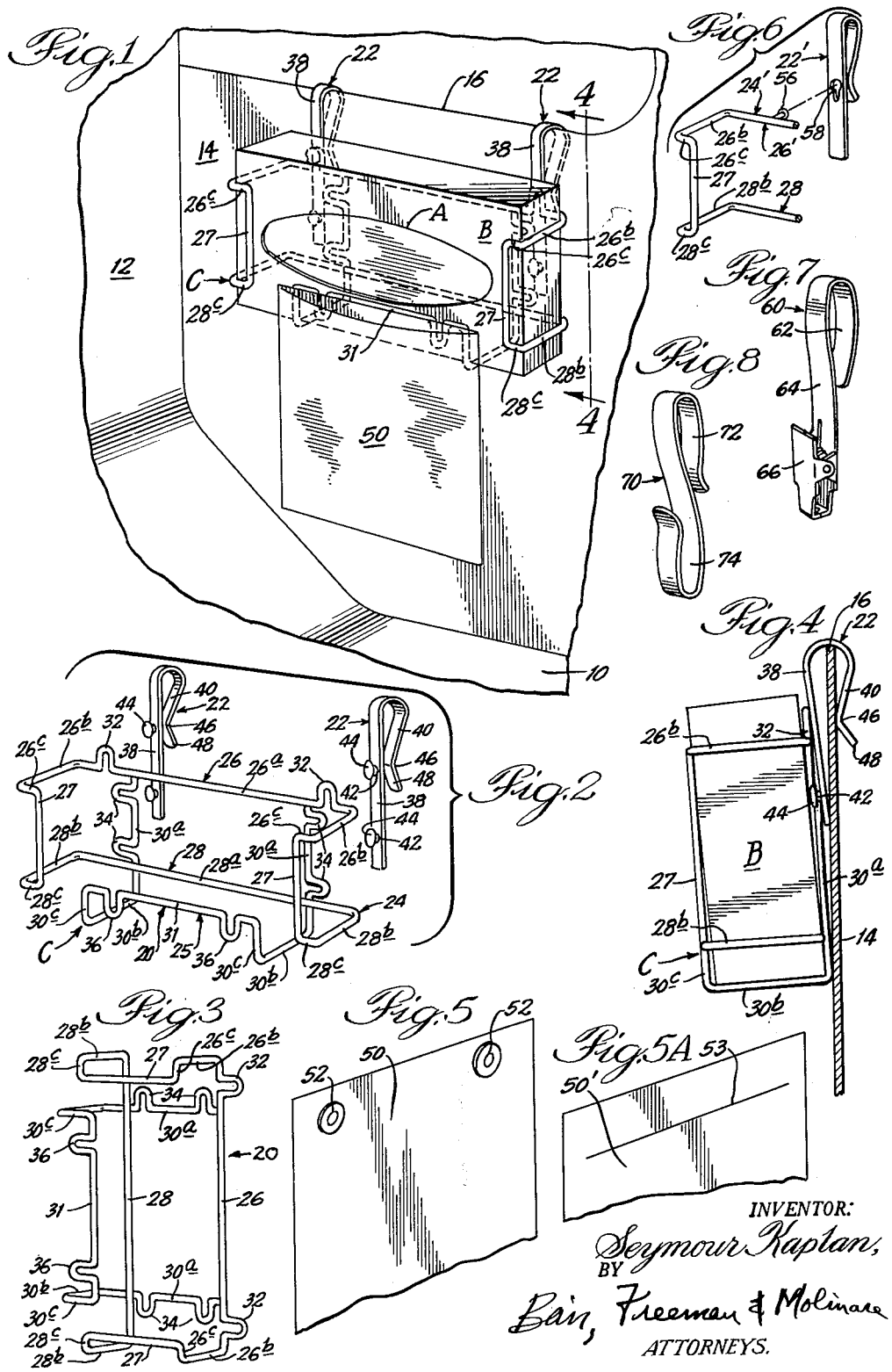
May 14, 1963 S. KAPLAN 3,089,597
CARRIER FOR BOXED TISSUES
Filed July 18, 1960
INVENTOR:
Seymour Kaplan,
BY
Bair, Freeman & Molinare
ATTORNEYS.

3,089,597
CARRIER FOR BOXED TISSUES
Seymour Kaplan, 6250 N. St. Louis Ave., Chicago, Ill.
Filed July 18, 1960, Ser. No. 43,491
4 Claims. (Cl. 211—88)

This invention relates to a carrier for boxed products and more particularly relates to a carrier for boxed tissues and the like.

The utilization of boxed tissues, such as those sold under the trademark "Kleenex," by auto passengers is well understood. It is desirable to provide a carrier for such boxed tissues, for use in an automobile, so that the box will be maintained in a desired location within the vehicle, thereby preventing the box being inadvertently sat upon or falling onto the floor.

Prior attempts to meet this need have produced either retainers for locating the box on the shelf-like surface above the dashboard or basket-like carriers which are quite bulky and unsightly for suspension from the underside of the dashboard. With the retainers on top of the dashboard, the location there is unsightly and may interfere with vision through the windshield. With carriers suspended from the underside of the dashboard, it is difficult to effect a rigid mounting for the carrier, and, furthermore, and in view of the limited leg room in most modern automobiles, the passengers frequently bump their legs against such devices causing considerable annoyance and frequently causing runs in the stockings of women passengers.

Thus, one object of this invention is to provide a carrier for boxed tissues and the like which is adapted to be rigidly mounted unobtrusively on the kick panel below the dashboard in an automobile, thereby locating the carrier for convenient access while simultaneously locating the carrier at a position where it will not cause annoyance to a passenger.

A further object of this invention is to provide a carrier for boxed tissues and the like which is characterized by its simplicity and inexpensiveness of construction and installation and by its effectiveness and success in operation.

While the desirability of disposable tissues for personal use in autos is well understood, heretofore the promotion of such use has been inhibited by the fact that there has been no really satisfactory way of disposing of the tissues after use. If one tries to stuff the used tissues into the auto's ash trays it is soon noted that the space provided is wholly inadequate. The disposing of used tissues through the windows is inappropriate as well as being contrary to anti-litter statutes of many states and municipalities.

Thus, another object of this invention is to provide the combination of a boxed-tissue carrier with attached means for receiving therein the used tissues.

And still another object of this invention is to provide a tissue dispenser that will fit substantially all automobiles regardless of year, model, or make. The dispenser of this invention has simplified features of installation which readily permits even an unskilled person to assemble the carrier in an auto.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

FIGURE 1 is a fragmentary view of a kick panel in an automobile upon which is mounted the boxed-tissue carrier of this invention;

FIGURE 2 is an exploded view of the boxed-tissue carrier of FIGURE 1 showing the wire frame box-receiving part and the pair of detachable hook members for use therewith;

FIGURE 3 is a view of the wire frame part of FIGURE 2 at an alternate attitude adapted for use in an installation similar to that shown in FIGURE 1;

FIGURE 4 is a cross-section view taken substantially on line 4—4 of FIGURE 1 and illustrating the installation of the boxed-tissue carrier in side view;

FIGURE 5 is a fragmentary enlarged view of the disposable, used-tissue receiving means and showing the connectors thereon for use with the wire frame part of FIGURES 1 and 2;

FIGURE 5A is a view similar to FIGURE 5 showing a modified form of the used-tissue disposal envelope;

FIGURE 6 is a fragmentary perspective view similar to a portion of FIGURE 2 showing a modified form of carrier and detachable hook member for use therewith; and FIGURES 7 and 8 are perspective views of other forms of hook members that may be used with a wire frame box-receiving part of the type generally shown in FIGURE 2.

Referring now to the drawings, there is shown in FIGURE 1 portions of the leg room region of an automobile wherein the carrier of this invention is adapted to be mounted. The floor of the automobile is indicated at 10, the fire wall, or forward kick panel which decoratively obscure the fire wall, is indicated at 12, and the decorative side kick panel, which is attached to a portion of the body of the auto is indicated at 14. The upper edge of side kick panel is shown at 16.

The boxed-tissue carrier is generally indicated at C and, as seen in FIGURE 1, snugly carries therein a tissue-containing box B which has a central access aperture A that is spaced inwardly of the edges of the box and through which individual tissues may be selectively removed.

As best seen in FIGURES 2–4, the carrier C includes a box-receiving frame 20 and a pair of detachable hook members 22. The frame 20 is defined by a first wire frame member 24 and a second wire frame member 25. The first wire member 24 is generally rectangularly arranged with the long sides horizontal, as seen in FIGURES 2 and 4. The long sides of wire member 24 include upper side 26 and lower sides 28 which are shaped to define back sections 26a and 28a, a pair of spaced parallel side sections 26b and 28b, and inturned spaced terminals 26c and 28c that are interconnected by bights 27 and are located in a plane spaced forwardly of and parallel to a back plane through sections 26a and 28a.

The second wire frame member 25 is generally L-shaped in that when viewed in side elevation it defines an upright long leg and a lower short leg. The frame member 25 defines a pair of spaced, elongated, upright sections 30a, spaced horizontal leg sections 30b, and upwardly extending spaced terminal sections 30c that are interconnected by a bight 31 to define an upturned toe that is located in substantially the same plane as terminals 26c and 28c and bights 27. The upright sections 30a are secured, by welding or the like, to the back sections 26a and 28a of the first wire member. The rigid interconnection of sections 30a with sections 26a and 28a causes the two wire members 24 and 25 to mutually reinforce each other to define a rigid, sturdy and lightweight frame.

The upper edge 26a of the frame's back is formed with a pair of downwardly opening loops, or connectors, 32 located outwardly of leg sections 30a. At least one of leg sections 30a is formed with a pair of loops or connectors 34 which open in the direction toward the other leg section 30a. The bight 31 is preferably formed with a pair of upwardly opening loops, or connectors, 36.

Each detachable hook member 22 is preferably a molded part of a resilient plastic in the form of an inverted loop, or U, that defines a relatively long arm 38 and a relatively short arm 40. The width of the arms 38 and 40 transverse to the length of those arms is relatively very small. The long arm 38 has defined thereon at least one headed connector extending outwardly of arm 38, and each connector defining a reduced neck 42 for selectively entering one of the loops, or connectors 32 or 34, and an enlarged retaining head 44 spaced from the arm 38 and adapted to engage portions of the frame members 24 or 25 inwardly of the frame's back to effect a detachable, but rigid, connection between the hook member 22 and the frame 20 to suspend frame 20 from hooks 22. The short arm 40 has an elbow 46 therein which extends toward the long arm 38 and then turns outwardly to terminate in a tip 48 that projects outwardly and downwardly of elbow 46.

From the foregoing it will be understood that the hooks 22 are adapted to hook over the upper edge 16 of the kick panel 14 to locate the short arm 40 behind the panel 14 with the elbow 46 engaging the rear side of panel 14 to draw the long arm 38 toward the forward side of panel 14. The inherent resilience of the material of hook 22 first permits selective bending of the long arm 38 outwardly away from panel 14 a distance sufficient to permit attaching the frame 20 to the hooks 22 by means of connectors 32, as seen in FIGURES 1 and 4, but then, after connection, the resilience of hooks 22 tends to draw frame 20 closely adjacent the forward side of the support panel 14.

While it will be understood that the hook members 22 may be formed integral with frame 20, for example, by making hooks 22 an upward extension of sections 30a, it is contemplated that hooks 22 will be separable from frame 20. It should be understood that frequently there is but slight clearances above edge 16 of panel 14, so that the hooks 22 being separable from frame 20 permit of manipulation to align their length parallel to edge 16, and the small width of hook 22 permits of hooking the short leg 40 behind the panel. The latter feature is frequently desirable since in many modern autos the upper edge 16 of the kick panel is closely spaced below an overhanging body part and it would be impossible to insert the hook 22 except for its manipulability as aforesaid. The diverging tip 48 assists in entering arm 40 rearwardly of panel 14.

When rectangular frame 20 is mounted as seen in FIGURES 1 and 4 it defines a rectangular back having hook-like edge restraints projecting forwardly from the two lateral edges and the bottom edge of the back. The extended ends of the three edge restraints are turned inwardly in a single plane that is spaced forwardly of and parallel to the back, and the two bights 27 and bight 31 are located in said forward plane to define a frame front that bounds an open central region that provides for relatively free access to the aperture A of box B and to the contents of box B. The upper or fourth edge of the frame is unobstructed to permit selective removal and insertion of a box B into frame 20, and the frame is selectively dimensioned so that box B fits snugly therein.

FIGURE 3 illustrates how the frame 20 of carrier C may be positioned with its long dimension disposed vertically and its unobstructed edge opening laterally. When used as in FIGURE 3, the connectors 34 are attached to the headed connectors on hooks 22.

A desirable waste disposal container, or receptacle, for receiving therein a quantity of used tissues is provided by means of a flexible disposable envelope 50 formed of paper or other inexpensive material. The envelope 50 has an open upper edge and may, if desired, be provided with a closure flap that extends from the rear side of the envelope to overlie the open upper edge. The rear side of envelope 50 is provided near the upper edge thereof with a pair of spaced washers 52 that are each centrally connected to the envelope 50 to define manipulable annular connector flanges that may be bent away from immediate adjacent relationship with the envelope 50. This construction permits of selectively hooking connectors 52 into the upwardly opening loops 36 to suspend the envelope 50 from the lower front side of the frame 20 where it will not interfere with access to the apertures A in box B.

The envelope 50 tends to maintain its normally closed condition due to the prefolding and construction of the envelope. At the same time it is readily openable to receive thereinto a substantial quantity of used tissues and thereby provides an economical and convenient anti-litter means.

The long arm of each hook member 22 is preferably formed with a plurality of vertically spaced connectors, as seen in the figures, to provide means for locating the frame 20 at selected heights. Where the supporting hooks are formed integral with the frame, or as upward extensions of sections 30a, the separable connectors, such as the open-ended connectors on the frame and the headed connectors on the hooks, would be omitted. To permit of manipulation of the hooks to a horizontal attitude for insertion rearward of the kick panel, the hooks could be pin connected, or otherwise pivotally connected to the frame to afford selective positioning of the hooks relative to the frame.

It will be noted that the entire frame 20 is formed by only two wire members that are bent and formed to define the various parts and elements thereon. This simplified construction contributes to the inexpensiveness of the device.

In the modified form of FIGURE 5A, the used-tissue disposal envelope 50' is shown provided with an elongated slit 53 in one side of the envelope spaced below the upper edge of the envelope. The length of slit 53 is related to the length of a support tab formed on the forward side of the frame 20 so as to receive the tab into slit 53 whereby to support the envelope 50' from the frame. For example, the slit 53 may be made longer than the spacing of the two sections 30c seen in FIGURE 2 and the slit 53 will then receive therein the entire upturned toe of frame member 25, thereby providing a convenient separable connection of the envelope 50' to frame 20.

FIGURE 6 illustrates a modified form wherein the upper wire 26' of wire member 24' is provided with a pair of rearwardly extending spaced connectors, one of which is shown at 56. The connector 56 is headed and is adapted to cooperate with a keyhole slot 58 formed in a suspending hook member 22'. It will be noted that the connector-and-recess separable connection of FIGURE 6 is very similar to the connector-and-recess separable connection shown in FIGURE 2, the difference being that in FIGURE 6 the headed connector is on the frame member 24' and the cooperating recess is provided in the suspending hook 22'.

FIGURE 7 illustrates still another form of support member 60 that may be used with a wire frame of the type generally shown in FIGURE 2. The support member 60 includes a downwardly opening support hook defined by a short arm 62 and long arm 64. The long arm 64 carries a selectively manipulable, pivotally mounted, spring-biased toggle 66 that normally cooperates with arm 64 to define a wire-gripping connector means. A pair of members 60 may thus be selectively connected to spaced portions of the wire member 24 to suspend the frame 20 from the supports 60 after the supports have been hooked onto the kick panel 16 of an auto as hereinabove described.

In FIGURE 8 there is shown still another form of support member 70 that is formed by a single length of reversely bent material to define a downwardly opening support hook 72, for hooking over the upper edge of an auto's kick panel 16, and an upwardly opening connector hook means 74 thereon adapted to receive therein the wire member 24 of the frame 20.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A carrier for boxed tissues and the like comprising, in combination, a rectangular box holding frame defining a rectangular back, edge restraints projecting forwardly from three edges of the back, the extended ends of the three edge restraints being turned inwardly in a single plane that is spaced forwardly and parallel to the back to define portions of a front that bound an open central region that provides for relatively free access to the contents of a box adapted to be carried in said frame, the fourth edge of the frame being unobstructed to permit a rectangular box to be inserted and removed from said frame, said back being formed adjacent an edge thereof to define a pair of spaced connectors, said box holding frame being formed by only two wire members secured together and shaped to define said back, said three edge restraints, and said portions of a front, a pair of hook members made of resilient material and each defining a relatively short arm with an elbow therein and a relatively long arm with at least one headed connector stud extending outwardly thereof and with the elbow on the short arm normally located closely adjacent said long arm, the short arm of each hook member being adapted to slip over the upper edge of an upright support panel to position the short arm behind the panel with the elbow engaging the panel and with the long arm forwardly of the panel, the connectors on the back of the frame being selectively attached to connector studs on the pair of hook members to suspend the frame from the hook members, and the inherent resilience of the hook members permitting selective bending of the long arm of the hook member outwardly, to permit attachment between the frame and the hook member, but then tending to draw the frame member closely adjacent the forward side of the support panel.

2. A carrier for boxed tissues and the like comprising, in combination, a rectangular box holding frame defining a rectangular back and edge restraints projecting forwardly from the two short edges and one long edge of the back, each edge restraint including two spaced elements whose terminals are joined together by a bight element, the extended ends of the three edge restraints being turned inwardly to locate the bights of said edge restraints in a single plane that is spaced forwardly and parallel to the back to define portions of a front that bound an open central region that provides for relatively free access to the contents of a box adapted to be carried in said frame, the other long edge of the frame being unobstructed to permit a rectangular box to be inserted and removed from the frame, said unobstructed edge of the frame being disposed either vertically or along the top of the frame to avoid inadvertent dislocation of a box from within the frame, said back being formed adjacent the top edge thereof to define a pair of spaced connectors, said box holding frame being formed by only two wire members secured together and shaped to define said back, said three edge restraints, and said portions of a front, and a pair of hook members each defining a relatively short arm with an elbow therein and a relatively long arm with at least one connector thereon adapted for connection with a connector on the frame back.

3. A carrier for boxed tissues and the like comprising, in combination, a rectangular box holding frame defining a rectangular back and edge restraints projecting forwardly from the two short edges and one long edge of the back, each edge restraint including two spaced elements whose terminals are joined together by a bight element, the extended ends of the three edge restraints being turned inwardly to locate the bights of said edge restraints in a single plane that is spaced forwardly and parallel to the back to define portions of a front that bound an open central region that provides for relatively free access to the contents of a box adapted to be carried in said frame, the other long edge of the frame being unobstructed to permit a rectangular box to be inserted and removed from the frame, said unobstructed edge of the frame being disposed either vertically or along the top of the frame to avoid inadvertent dislocation of a box from within the frame, said back being formed adjacent the top edge thereof to define a pair of spaced connectors, said box holding frame being formed by only two wire members secured together and shaped to define said back, said three edge restraints, and said portions of a front, and said spaced connectors being loops defined in one of said wire members, a pair of hook members each defining a relatively short arm with an elbow therein and a relatively long arm with at least one connector thereon adapted for connection with a connector on the frame back, the front of said frame being formed adjacent the lower edge thereof to define a pair of spaced upwardly-opening loop connectors defined in the other wire member, and a waste disposal container carrying a pair of spaced connectors for selective connection to the spaced connectors on the front of the frame to be suspended therefrom.

4. A carrier for boxed tissues and the like comprising, in combination: a first, generally rectangularly-disposed, frame member of wire shaped to define a back, a pair of parallel sides, and inturned, spaced, terminals located in a plane spaced forwardly of and parallel to the back, and each of said back, parallel sides and terminals including a pair of spaced, parallel elements; a second, generally L-shaped, frame member of wire wherein the upright leg of the L is secured to said back and the horizontal leg of the L projecting forwardly of the back and defining a laterally elongated, upturned, toe located in said plane of the spaced terminals, and each leg of the L including a pair of spaced, parallel elements, with the elements of the upturned toe joined by a bight element; the upper edge of said back being formed with a pair of spaced, downwardly-opening, connector loops; a pair of hook members each having at least one headed connector stud extending outwardly thereof and adapted to engage one of said downwardly-opening connector loops to support the frame thereby; the bight element of the upturned toe of the second frame member being formed with a pair of spaced, upwardly-opening, connector loops; and a waste disposal container carrying a pair of spaced connectors for selective connection to the spaced connectors on the front of the frame to be suspended therefrom.

References Cited in the file of this patent

UNITED STATES PATENTS

| 904,080 | Orin | Nov. 17, 1908 |
| 1,080,539 | Conway | Dec. 9, 1913 |
| 1,501,087 | Anderson | July 15, 1924 |
| 2,221,659 | Wilkie | Nov. 12, 1940 |
| 2,280,294 | Leonard | Apr. 21, 1942 |
| 2,460,906 | Schmiedebero | Feb. 8, 1949 |
| 2,488,326 | Pratt | Nov. 15, 1949 |
| 2,507,842 | Waddill | May 16, 1950 |
| 2,887,216 | Hargraves | May 19, 1959 |